US012648512B1

(12) United States Patent
Williams

(10) Patent No.: US 12,648,512 B1
(45) Date of Patent: Jun. 9, 2026

(54) WICK APPLICATOR ASSEMBLIES

(71) Applicant: Larry Williams, Beckville, TX (US)

(72) Inventor: Larry Williams, Beckville, TX (US)

( * ) Notice: Subject to any disclaimer, the term of this patent is extended or adjusted under 35 U.S.C. 154(b) by 0 days.

(21) Appl. No.: 19/398,752

(22) Filed: Nov. 24, 2025

(51) Int. Cl.
*A01C 23/00* (2006.01)
*A01M 7/00* (2006.01)
*A01M 21/04* (2006.01)
*B05B 1/20* (2006.01)

(52) U.S. Cl.
CPC ......... *A01C 23/006* (2013.01); *A01M 7/0053* (2013.01); *A01M 7/0071* (2013.01); *A01M 21/043* (2013.01); *B05B 1/202* (2013.01)

(58) Field of Classification Search
CPC .............. A01M 21/043; A01M 7/0053; A01M 7/0071; A01C 23/047; A01C 23/006; A01B 59/048; A01B 59/064; B05B 3/12; B05B 1/202
See application file for complete search history.

(56) References Cited

U.S. PATENT DOCUMENTS

| | | | | |
|---|---|---|---|---|
| 4,187,638 A | * | 2/1980 | Hardy ................. | A01M 21/043 |
| | | | | 239/145 |
| 4,310,988 A | * | 1/1982 | Porter, Jr. ........... | A01M 21/043 |
| | | | | 239/145 |
| 4,377,920 A | * | 3/1983 | Bowman ............. | A01M 21/043 |
| | | | | 47/1.5 |
| 4,438,592 A | * | 3/1984 | Myers ................. | A01M 21/043 |
| | | | | 47/1.5 |
| 4,467,558 A | * | 8/1984 | Rathman ............. | A01M 7/0053 |
| | | | | 47/1.5 |
| 4,546,570 A | * | 10/1985 | Schaeffer ............ | A01M 21/043 |
| | | | | 47/1.5 |
| 4,735,013 A | * | 4/1988 | Richardson ......... | A01M 21/043 |
| | | | | 47/1.7 |

OTHER PUBLICATIONS

Keenan et al, An Apparatus for Mounting a too to a Tractor, Dec. 12, 1983 (Year: 1983).*
Weckman; Dec. 27, 2017; Boom Arrangement and Method for Adjusting the Tilt Position of the Boom Arrangement (Year: 2017).*

* cited by examiner

*Primary Examiner* — Alicia Torres
(74) *Attorney, Agent, or Firm* — R. Keith Harrison

(57) ABSTRACT

Wick applicator assemblies may include a reservoir support frame. An assembly mount portion may be configured for coupling to the vehicle. The assembly mount portion may pivotally interface with the reservoir support frame. The reservoir support frame may be pivotal with respect to the assembly mount portion along a vertical axis. At least one frame mobility member may be on the reservoir support frame. The frame mobility member may be configured to support the reservoir support frame for traversal on the terrain. A liquid reservoir may be supported by the reservoir support frame. The liquid reservoir may have a reservoir interior configured to contain the applicator liquid. At least one wick member may be on the liquid reservoir. The wick member may be disposed in fluid wicking relationship to the reservoir interior of the liquid reservoir for wicking and discharge of the applicator liquid.

16 Claims, 15 Drawing Sheets

WICK APPLICATOR ASSEMBLIES

FIELD

Illustrative embodiments of the disclosure generally relate to wick applicators suitable for applying agricultural and/or other applicator liquids to vegetation. More particularly, illustrative embodiments of the disclosure are directed to wick applicator assemblies configured for coupling to a vehicle and capable of traversing terrains having various contours.

SUMMARY

Illustrative embodiments of the disclosure are generally directed to wick applicator assemblies configured for coupling to a vehicle and traversing variously contoured terrain to discharge an applicator liquid on the terrain. An illustrative embodiment of the wick applicator assemblies may include a reservoir support frame. An assembly mount portion may be configured for coupling to the vehicle. The assembly mount portion may pivotally interface with the reservoir support frame. The reservoir support frame may be pivotal with respect to the assembly mount portion along a vertical axis. At least one frame mobility member may be on the reservoir support frame. The frame mobility member may be configured to support the reservoir support frame for traversal on the terrain. A liquid reservoir may be supported by the reservoir support frame. The liquid reservoir may have a reservoir interior configured to contain the applicator liquid. At least one wick member may be on the liquid reservoir. The wick member may be disposed in fluid wicking relationship to the reservoir interior of the liquid reservoir for wicking and discharge of the applicator liquid onto vegetation on the terrain.

In some embodiments, the wick applicator assembly may include an assembly mount portion configured for coupling to the vehicle. A reservoir support frame may pivotally interface with the assembly mount portion. The reservoir support frame may include at least one main support frame member having a rear frame member end and a front frame member end. The rear frame member end of the main support frame member may be pivotal with respect to the assembly mount portion along a vertical axis. A front support frame member may be on the front frame member end of the main support frame member. At least one frame mobility member may be on the reservoir support frame. The frame mobility member may be configured to support the reservoir support frame for traversal on the terrain. A liquid reservoir may be supported by the front support frame member of the reservoir support frame. The liquid reservoir may have a reservoir interior configured to contain the applicator liquid. At least one wick member may be on the liquid reservoir. The wick member may be disposed in fluid wicking relationship to the reservoir interior of the liquid reservoir for wicking and discharge of the applicator liquid onto vegetation on the terrain.

In some embodiments, the wick applicator assembly may include a pair of spaced-apart frame hooks configured for engagement with the vehicle. A reservoir support frame may pivotally interface with the assembly mount portion. The reservoir support frame may include a pair of elongated, parallel, spaced-apart main support frame members having a pair of rear frame member ends, respectively, and a pair of front frame member ends, respectively. The rear frame member ends may be pivotal with respect to the assembly mount portion along a vertical axis. A front support frame member may be on the front frame member ends of the main support frame members. A tensioning frame may include a pair of parallel, spaced-apart vertical tensioning frame members supported by the assembly mount portion. A lower tensioning frame member may extend between the vertical tensioning frame members. An upper tensioning frame member may extend between the vertical tensioning frame members in parallel, spaced-apart relationship to the lower tensioning frame member. A pair of reservoir support frame tensioning members may extend from the vertical tensioning frame members, respectively, to the front support frame member of the reservoir support frame. At least one frame mobility member may be on the reservoir support frame. The frame mobility member may be configured to support the reservoir support frame for traversal on the terrain. A liquid reservoir may include an elongated liquid reservoir wall supported by the reservoir support frame. The liquid reservoir wall may have a first reservoir end, a second reservoir end, and a reservoir interior extending from the first reservoir end to the second reservoir end. The reservoir interior may be configured to contain the applicator liquid. A plurality of wick members may be on the liquid reservoir. The wick members may be disposed in fluid wicking relationship to the reservoir interior of the liquid reservoir for wicking and discharge of the applicator liquid onto vegetation on the terrain. A reservoir cap may close the reservoir interior at the first reservoir end. A liquid fill device may be disposed in fluid communication with the reservoir interior at the second reservoir end.

BRIEF DESCRIPTION OF THE DRAWINGS

Illustrative embodiments of the disclosure will now be described, by way of example, with reference to the accompanying drawings, in which.

DETAILED DESCRIPTION

Figure 1:
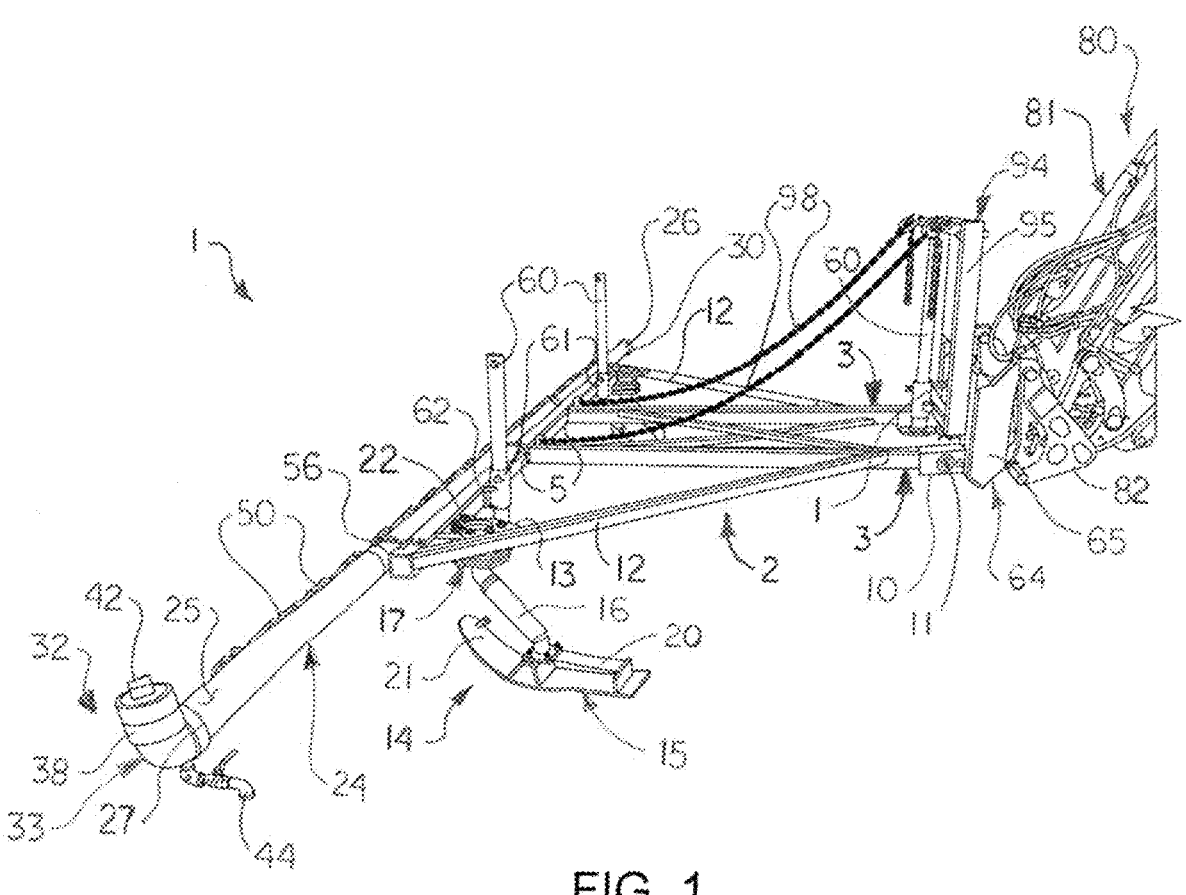
FIG. 1 is a left side perspective view of an illustrative embodiment of the wick applicator assemblies, coupled to a front end loader vehicle (shown in section) in typical application of the wick applicator assemblies.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the subject matter as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Unless expressly or implicitly indicated otherwise, throughout the description and the appended claims, the terms "comprise", "comprising", "comprised of" and the like are to be construed in an inclusive sense as opposed to an exclusive or exhaustive sense, and are equivalent to the phrase, "including but not limited to". Each embodiment disclosed herein can comprise, consist essentially of, or consist of its particular stated element, step, ingredient, or limitation. As used herein, the transition terms "comprise", "comprises", "comprising", "include", "includes", "including", "is", "has", "having" or the like means "includes, but is not limited to, and allows for the inclusion of unspecified elements, steps, ingredients, or limitations, even in major amounts". The transitional phrase "consisting of" excludes any element, step, ingredient, or limitation not specified. The transition phrase "consisting essentially of" shall limit the scope of the embodiment to the specified elements, steps, ingredients, or limitations and to those that do not materially affect the embodiment. Throughout the written description, drawings and claims appended hereto, unless otherwise noted, it shall be recognized and understood that each embodiment of the described, illustrated and claimed subject matter may comprise, consist essentially of, or consist of any component, element or combination of components or elements set forth herein.

All methods set forth in the present disclosure may be performed in any suitable order of steps unless otherwise indicated herein or contradicted by the rules of logic. The use of any and all examples or exemplary language provided herein is intended to clearly describe the subject matter of the disclosure and is not intended to be limiting on the scope of the subject matter set forth in the claims. No element, step, ingredient, or limitation mentioned or described in the specification shall not be construed as regarding any unclaimed component, step, or limitation to be essential in practicing the claimed subject matter.

Unless otherwise noted using precise or limiting terminology, all numbers which express quantities of ingredients throughout the specification and claims are to be understood as being approximations of the numerical value cited to express the quantities of those ingredients. As used throughout the specification and claims, the terms "about", "approximately", and "generally" each has the meaning reasonably ascribed to it by a person skilled in the art when used in conjunction with a stated numerical value or range, i.e., denoting from the exact stated value or range to somewhat more or somewhat less than the stated value or range, from a deviation of from 0% with respect to the stated value or range to up to and including 20% of the stated value or range in either direction. As used throughout the specification and claims, the term "substantially" denotes any value from the exact stated value or range to somewhat more or somewhat less than the stated value or range, from a deviation of from 0% with respect to the stated value or range to up to and including 10% of the stated value or range in either direction.

Unless otherwise noted using precise or limiting terminology, all numbers which express quantities of ingredients throughout the specification and claims are to be understood as being approximations of the numerical value cited to express the quantities of those ingredients. As used throughout the specification and claims, the term "about" has the meaning reasonably ascribed to it by a person skilled in the art when used in conjunction with a stated numerical value or range, i.e., denoting from the exact stated value or range to somewhat more or somewhat less than the stated value or range, from a deviation of from 0% with respect to the stated value or range to up to and including 20% of the stated value or range in either direction.

Various illustrative embodiments of the disclosure are described herein. Variations on the described illustrative embodiments may become apparent to those of ordinary skill in the art in reading the specification, drawings and claims of the disclosure. Accordingly, the disclosure encompassed by the specification, claims and drawings includes all modifications and equivalents of the subject matter recited in the claims as permitted by applicable law. Additionally, any combination of the elements in all possible variations thereof is encompassed by the subject matter of the disclosure unless otherwise indicated herein.

Referring to the drawings, an illustrative embodiment of the wick applicator assemblies is generally indicated by reference number 1. As illustrated in FIGS. 1-4 and will be hereinafter described, the wick applicator assembly 1 may be configured for coupling to a vehicle 80 such as a front end loader vehicle, for example and without limitation. By operation of the vehicle 80, the wick applicator assembly 1 may traverse variously contoured terrain such as flat terrain 86 (FIG. 9); inclined terrain 87 (FIG. 10); and/or sloped terrain 88 (FIG. 11) while discharging an applicator liquid 48 (FIG. 13) such as insecticide, pesticide, herbicide, fertilizer and/or other agricultural liquid, for example and without limitation, on the terrain.

Figure 2:
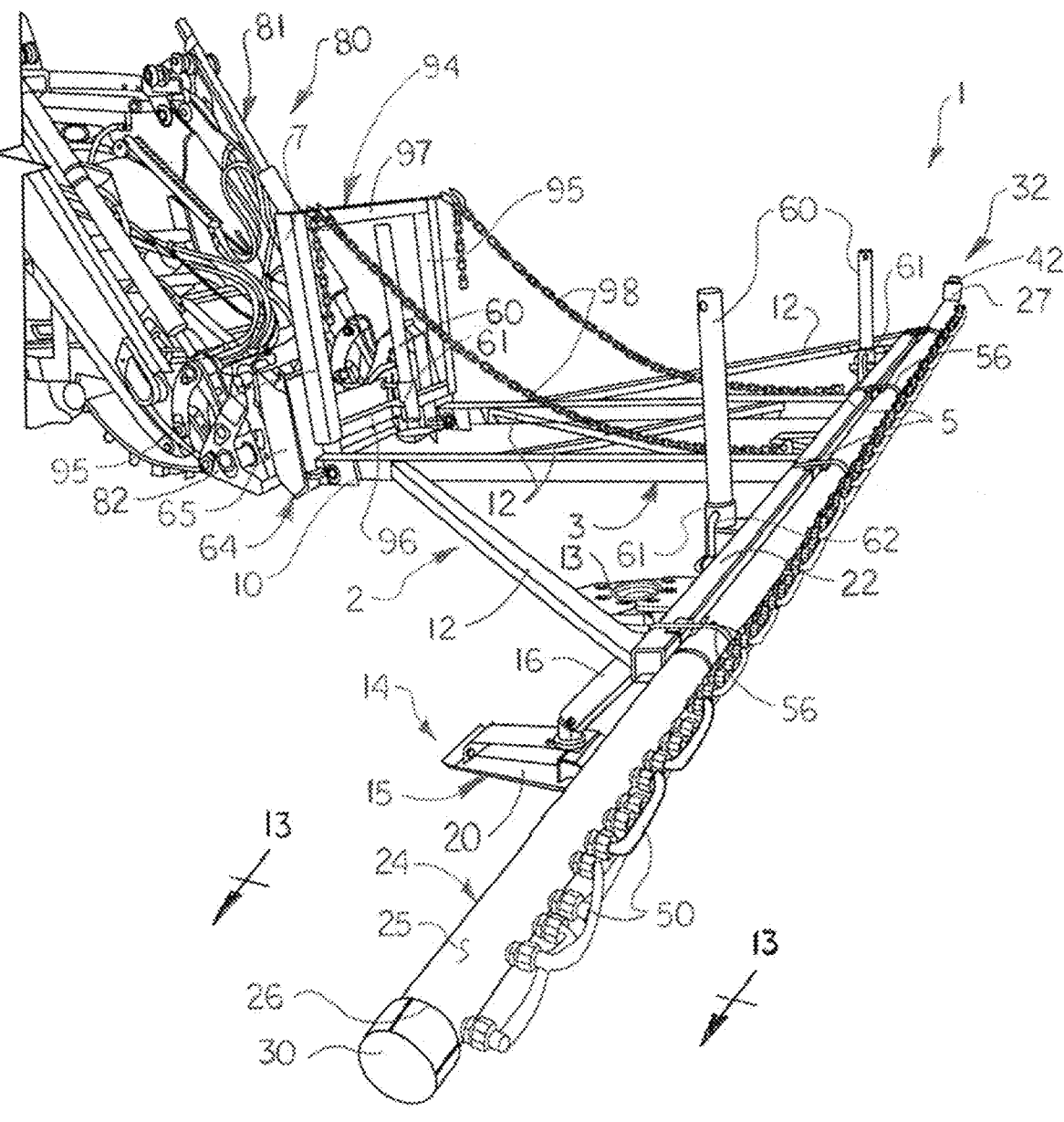
FIG. 2 is a right side perspective view of the illustrative wick applicator assembly coupled to the vehicle.
Figure 8:
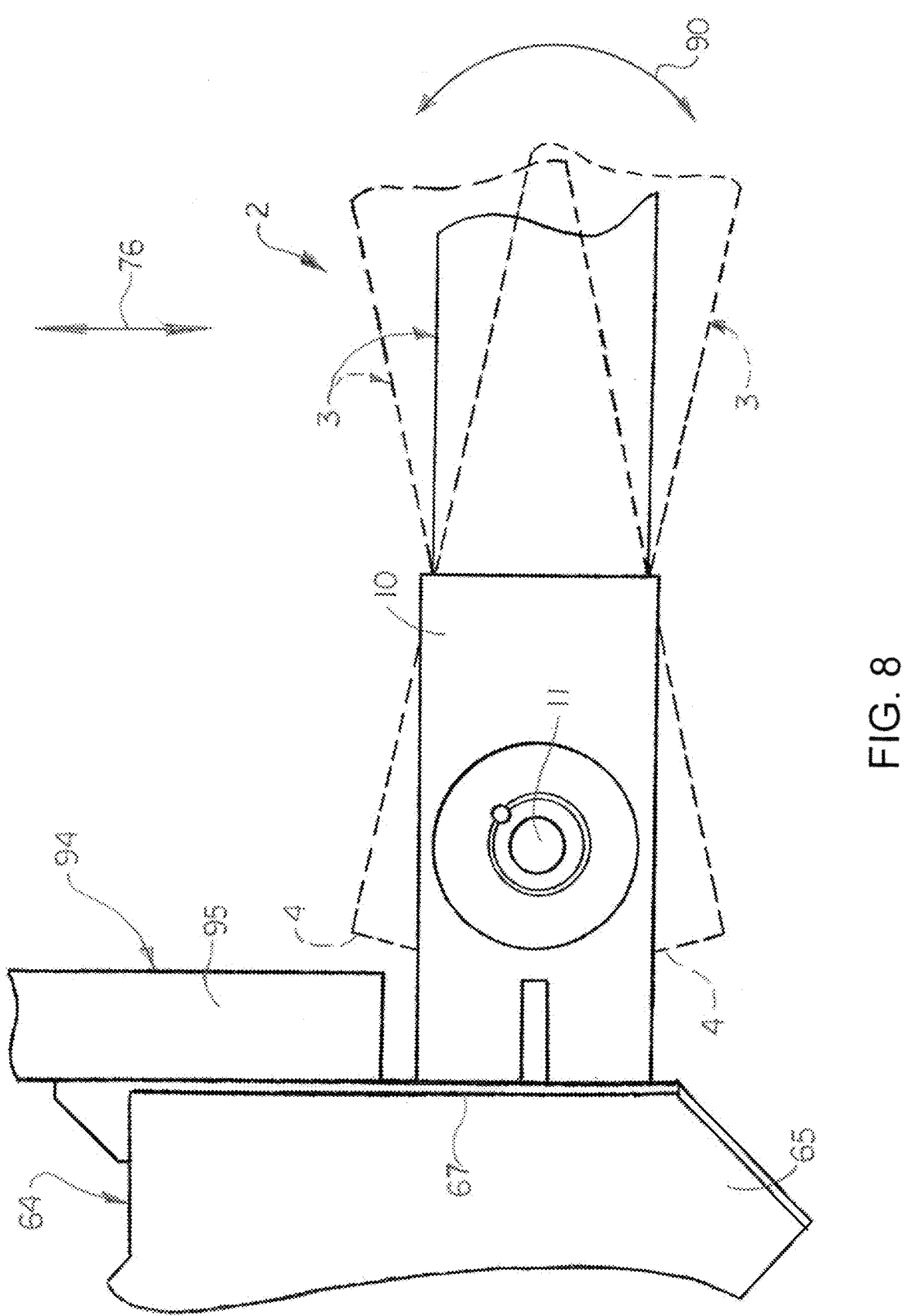
FIG. 8 is an enlarged sectioned side view illustrating typical pivotal mounting of the reservoir support frame to the assembly mount portion of the wick applicator assembly.

As illustrated in FIGS. 1 and 2, the wick applicator assembly 1 may include a reservoir support frame 2. An assembly mount portion 64 may be on the reservoir support frame 2. The assembly mount portion 64 may be configured for coupling the reservoir support frame 2 to the vehicle 80. For example and without limitation, as illustrated in FIGS. 1-4, in some embodiments, the assembly mount portion 64 may be configured to couple to a bucket mount frame 82 on the boom 81 of a front end loader vehicle 80, typically as will be hereinafter described. As illustrated in FIG. 8, in some embodiments, the reservoir support frame 2 may be pivotal with respect to the assembly mount portion 64 about a support frame pivot arc 90 and within a vertical plane 76, which vertical plane 76 is perpendicular to flat terrain (86, FIG. 9) over which the reservoir support frame (2) may traverse in operation of the wick applicator assembly (1).

Figure 9:
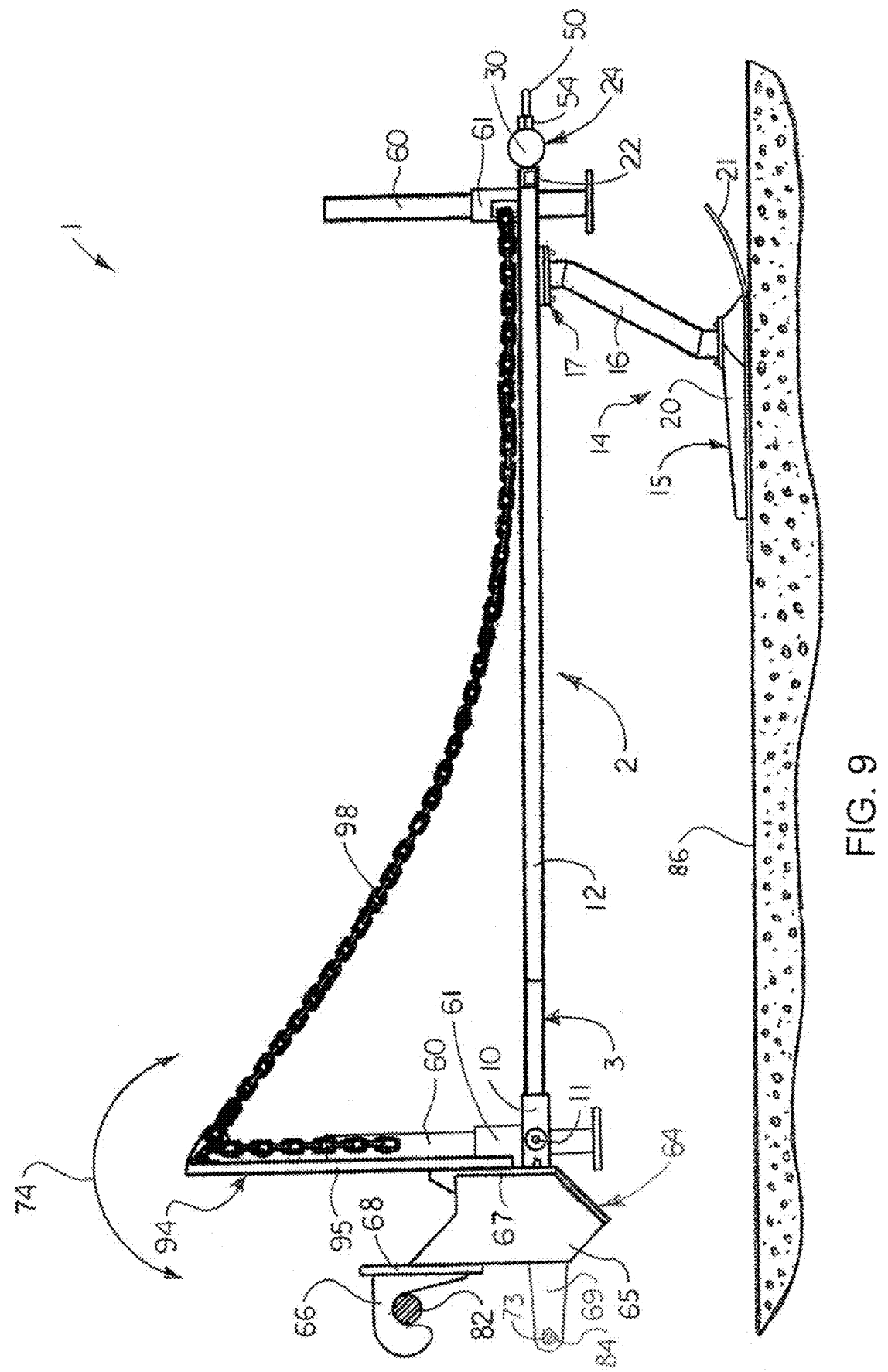
FIG. 9 is a right side view of the wick applicator assembly as the reservoir support frame traverses flat terrain in typical application of the wick applicator assembly.
Figure 10:
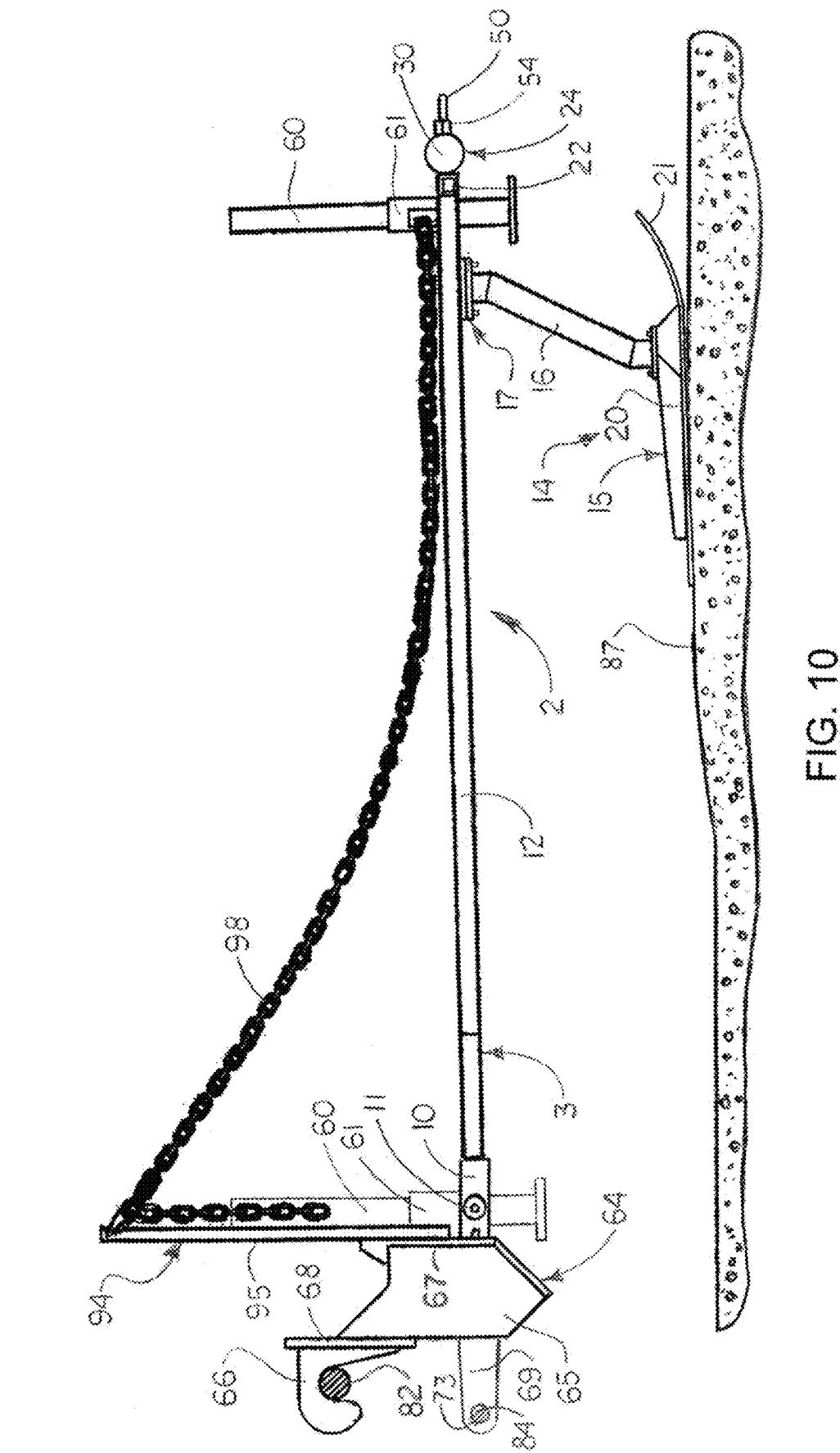
FIG. 10 is a right side view of the wick applicator assembly as the reservoir support frame traverses inclined terrain in typical application of the wick applicator assembly.
Figure 11:
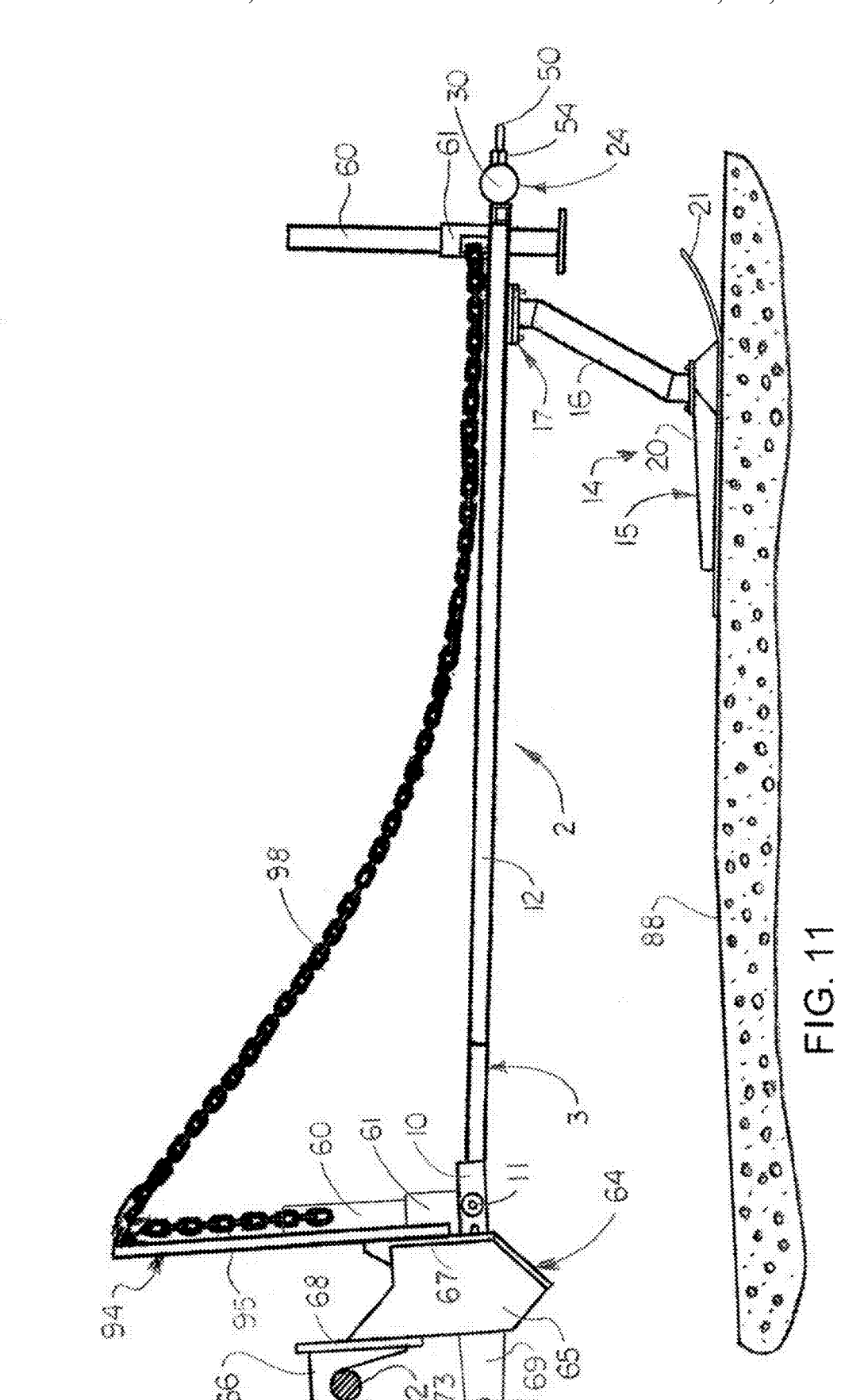
FIG. 11 is a right side view of the wick applicator assembly as the reservoir support frame traverses sloped terrain in typical application of the wick applicator assembly.

As further illustrated in FIGS. 1 and 2, at least one frame mobility member 14 may be on the reservoir support frame 2. As illustrated in FIGS. 9-11, the frame mobility member 14 may be configured to support the reservoir support frame 2 for traversal of the wick applicator assembly 1 on the flat terrain 86, the inclined terrain 87 and/or the sloped terrain 88, typically as will be hereinafter described.

Figure 13:
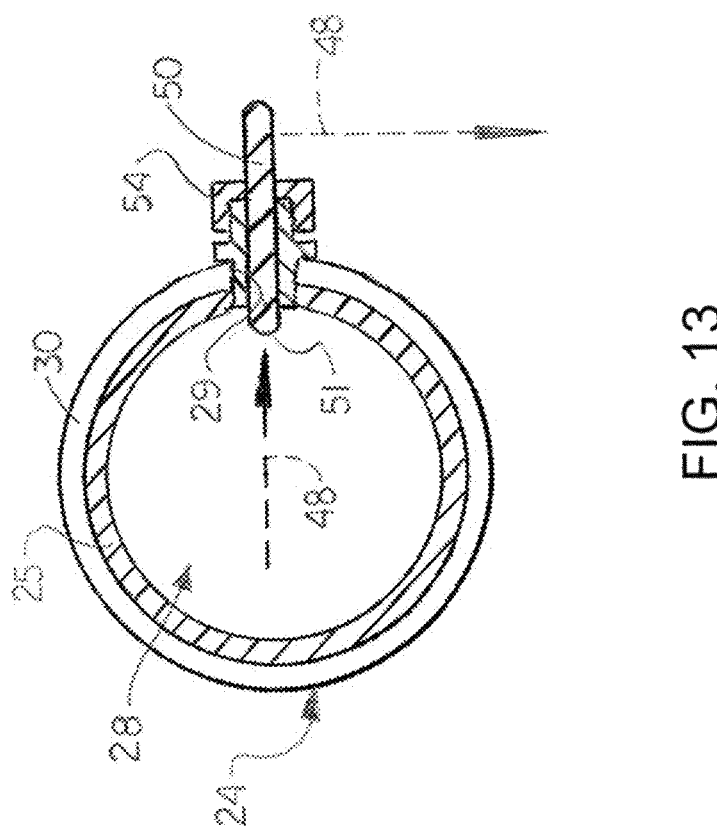
FIG. 13 is a cross-sectional view, taken along section lines 13-13 in FIG. 2, of a typical liquid reservoir of the wick applicator assembly.

At least one liquid reservoir 24 may be supported by the reservoir support frame 2. As illustrated in FIG. 13, the liquid reservoir 24 may have a reservoir interior 28 which is configured to contain the applicator liquid 48. At least one wick member 50 may be on the liquid reservoir 24. The wick member 50 may be disposed in fluid wicking relationship to the reservoir interior 28 of the liquid reservoir 24 for wicking and subsequent discharge of the applicator liquid 48 onto vegetation on the terrain 86, 87, 88.

Figure 3:
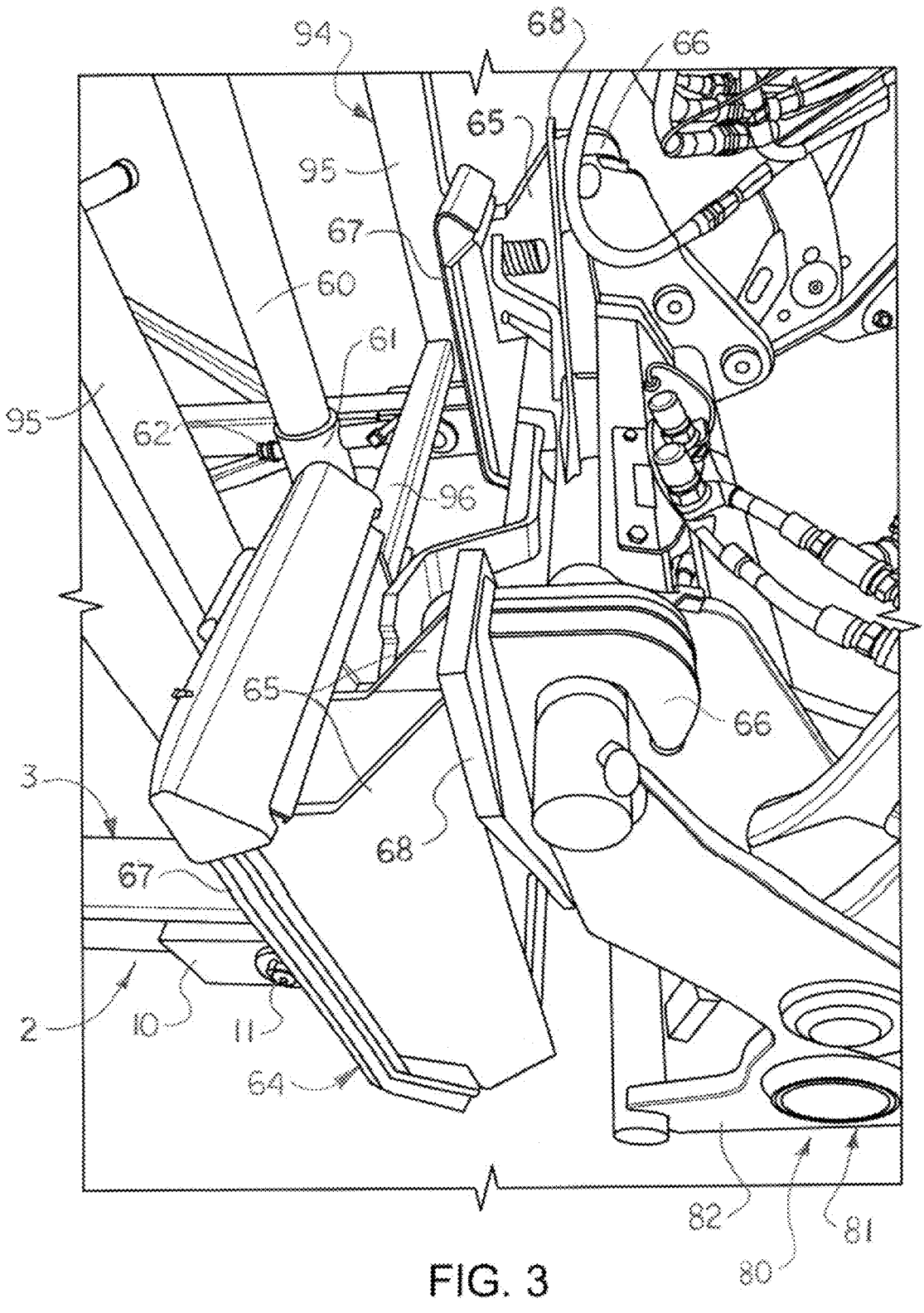
FIG. 3 is an enlarged side perspective view of a typical assembly mount portion which is suitable for coupling the reservoir support frame of the wick applicator assembly to the vehicle.
Figure 4:
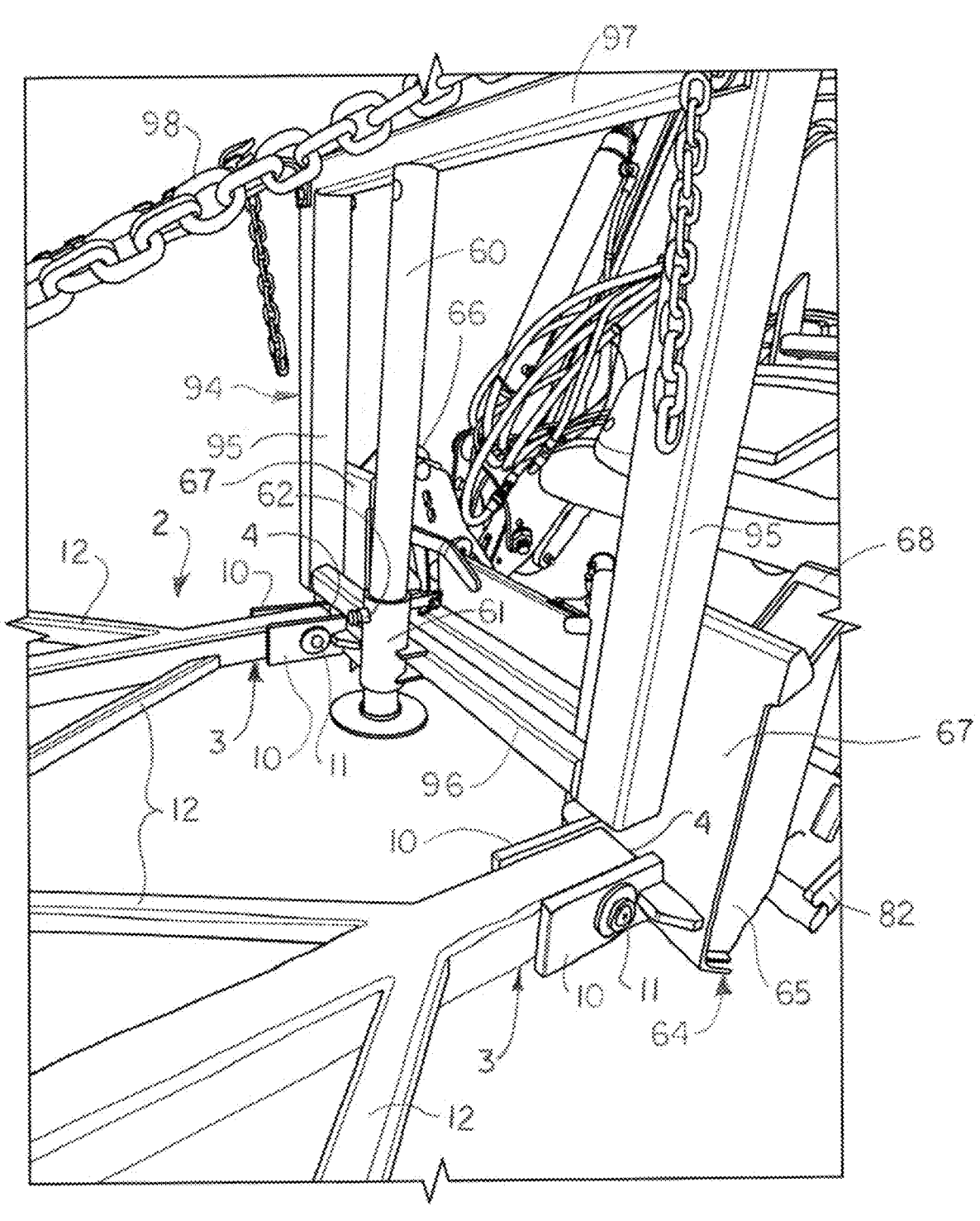
FIG. 4 is a front perspective view illustrating typical pivotal mounting of the reservoir support frame to the assembly mount portion of the wick applicator assembly.

The assembly mount portion 64 of the wick applicator assembly 1 may have any design which is suitable for the purpose of coupling the reservoir support frame 2 to the vehicle 80. The assembly mount portion 64 may be configured to couple the reservoir support frame 2 to the bucket mount frame 82 on the boom 81 of the front end loader vehicle 80 such that the assembly mount portion 64 is operable to tilt forwardly and rearwardly with the bucket mount frame 82 along a frame tilt arc 74 (FIG. 9). For example and without limitation, as illustrated in FIG. 3, in some embodiments, the assembly mount portion 64 may include at least one pair of spaced-apart mount frame coupling hooks 66. The frame coupling hooks 66 may be suitably sized and configured to engage the bucket mount frame 82 on the boom 81 of the front end loader vehicle 80 typically after removal of the excavator bucket (not illustrated) from the bucket mount frame 82. As illustrated in FIGS. 3 and 4, in some embodiments, the assembly mount portion 64 may include a pair of spaced-apart main mount plates 67 which may structurally interface with the reservoir support frame 2 typically as will be hereinafter described. A pair of spaced-apart assembly mount portion plates 65 may extend from each main mount plate 67. At least one hook mount plate 68 may be mounted on each pair of assembly mount portion plates 65. The frame coupling hooks 66 may extend from the respective hook mount plates 65. Each frame coupling hook 66 may be attached to its corresponding hook mount plate 65 using bolts, screws, brackets, welding, and/or other mechanical fasteners and/or attachment techniques which may be suitable for the purpose.

As illustrated in FIGS. 7 and 9-12, in some embodiments, a pair of frame coupling flanges 69 may be mounted on each hook mount plate 68, typically generally beneath the respective frame coupling hooks 66. The frame coupling flanges 69 may have a respective pair of registering pin openings 73 (one of which is shown). The pin openings 73 may be suitably sized and configured to receive a respective pair of bucket mount pins 84 which are on the bucket mount frame 82 and selectively insert into the respective pin openings 73 to additionally mount the assembly mount portion 64 to the bucket mount frame 82. For example and without limitation, in some embodiments, the bucket mount pins 84 may be selectively hydraulically operated and actuatable to slide to the right to facilitate attachment and to slide to the left to facilitate disengagement of the assembly mount portion 64 with respect to the bucket mount frame 82. It will be recognized and understood that additional or alternative techniques may be used to couple or mount the assembly mount portion 64 to and/or facilitate engagement of the assembly mount portion 64 with the bucket mount frame 82 of the front end loader vehicle 80. These techniques may include but are not limited to hooks, bolts, screws, clamps, brackets, flanged and grooved fasteners, welding, and combinations thereof.

The reservoir support frame 2 may have any design which is suitable for the purpose of supporting the assembly mount portion 64 and the liquid reservoir 24. Accordingly, as further illustrated in FIGS. 1 and 2, in some embodiments, the reservoir support frame 2 may include at least one, and typically, a pair of elongated, parallel, spaced-apart main support frame members 3. Each main support frame member 3 may have a rear support frame member end 4 (FIG. 8) and a front support frame member end 5 (FIGS. 1 and 2). The rear support frame member end 4 of each main support frame member 3 may structurally interface with the assembly mount portion 64. For example and without limitation, as illustrated in FIG. 8, in some embodiments, the rear support frame member end 4 of each main support frame member 3 may pivotally interface with each corresponding assembly mount portion plate 65 of the assembly mount portion 64. Accordingly, as illustrated in FIG. 4, a pair of spaced-apart, parallel frame flanges 10 may extend forwardly from each main mount plate 67 of the assembly mount portion 64. The frame flanges 10 may be welded and/or otherwise fixedly or rigidly mounted to the main mount plate 67. The rear support frame member end 4 of each main support frame member 3 may be disposed between the frame flanges 10 of each corresponding frame flange 10 pair. A frame pin 11 may extend through registering pin openings (not illustrated) in the frame flanges 10 and in the main support frame member 3. As further illustrated in FIG. 8, each frame pin 11 may render each corresponding main support frame member 3, and the reservoir support frame 2, pivotal between the frame flanges 10 and about a support frame pivot arc 90 (FIG. 8) within the vertical plane 76. The pivotal interface of the main support frame members 3 with respect to the assembly mount portion 64 may enable the reservoir support frame 2 to accommodate variations in the contour of the terrain, such as the flat terrain 86 (FIG. 9), the inclined terrain 87 (FIG. 10), and/or the sloped terrain 88 (FIG. 11), as the wick application assembly 1 is engaged for traversal of the terrain by forward and/or reverse operation of the vehicle 80, typically as will be hereinafter described.

A front support frame member 22 may be supported by the main support frame members 3 of the reservoir support frame 2. The front support frame member 22 may be elongated and perpendicular with respect to the main support frame members 3. As illustrated in FIG. 2, the front support frame member ends 5 of the respective main support frame members 3 may terminate on the front support frame member 22. The liquid reservoir 24 may be supported by the front support frame member 22.

At least one reinforcing support frame member 12 may extend between each main support frame member 3 and the front support frame member 22 of the reservoir support frame 2. In some embodiments, at least one reinforcing support frame member 12 may extend between the main support frame members 3.

As illustrated in FIGS. 1 and 2, in some embodiments, a gantry or tensioning frame 94 may be on the assembly mount portion 64. The tensioning frame 94 may include at least one, and typically, a pair of elongated, parallel, spaced-apart vertical tensioning frame members 95. As illustrated in FIG. 8, the lower end portion of each vertical tensioning frame member 95 may be fastened, welded, and/or otherwise attached to each corresponding main mount plate 67 of the assembly mount portion 64. As illustrated in FIG. 2, a lower tensioning frame member 96 may extend between the lower end portions of the vertical tensioning frame members 95. An upper tensioning frame member 97 may extend between the upper end portions of the vertical tensioning frame members 95, typically above and in parallel, spaced-apart relationship to the lower tensioning frame member 96.

At least one, and typically, a pair of reservoir support frame tensioning members 98 may extend from the tensioning frame 94 to the reservoir support frame 2. Each reservoir support frame tensioning member 98 may include any flexible or resilient device, element, component, or combination thereof which is suitable to maintain the plane of the reservoir support frame 2 within a generally horizontal plane. In some embodiments, the reservoir support frame tensioning member 98 may include at least one reservoir support frame tensioning chain, as illustrated. In some embodiments, each reservoir support frame tensioning member 98 may additionally or alternatively include at least one cable, rope, strap, cord, and/or other like element or elements.

The tensioning frame 94 and the reservoir support frame tensioning members 98 may enable the liquid reservoir 24 to follow the contour of a hole or depression (not illustrated) in the terrain 86, 87, 88. As illustrated in FIG. 9, responsive to forward and reverse tilting of the bucket mount frame 82 on the boom 81 of the front end loader vehicle 80, the tensioning frame 94 may correspondingly tilt forwardly and rearwardly, respectively, along a frame tilt arc 74. In the forwardly tilted position of the bucket mount frame 82, the tensioning frame 94 may likewise tilt forwardly along the front tilt arc 74 to slacken the reservoir support frame tensioning members 98, thereby allowing the reservoir support frame 2 to pivot downwardly about the frame pin 11 such that the frame mobility member 14 and the liquid reservoir 24 can drop and follow the initially descending contour of the hole or depression in the terrain 86, 87, 88. The bucket mount frame 82 may subsequently be tilted in reverse to likewise reverse tilt the tensioning frame 94 and tighten the reservoir support frame tensioning members 98 between the tensioning frame 94 and the reservoir support frame 2, thereby raising the reservoir support frame 2 as it pivots upwardly about the frame pin 11 such that the frame mobility member 14 and the liquid reservoir 24 rise to subsequently follow the ascending contour of the hole or depression.

Figure 5:
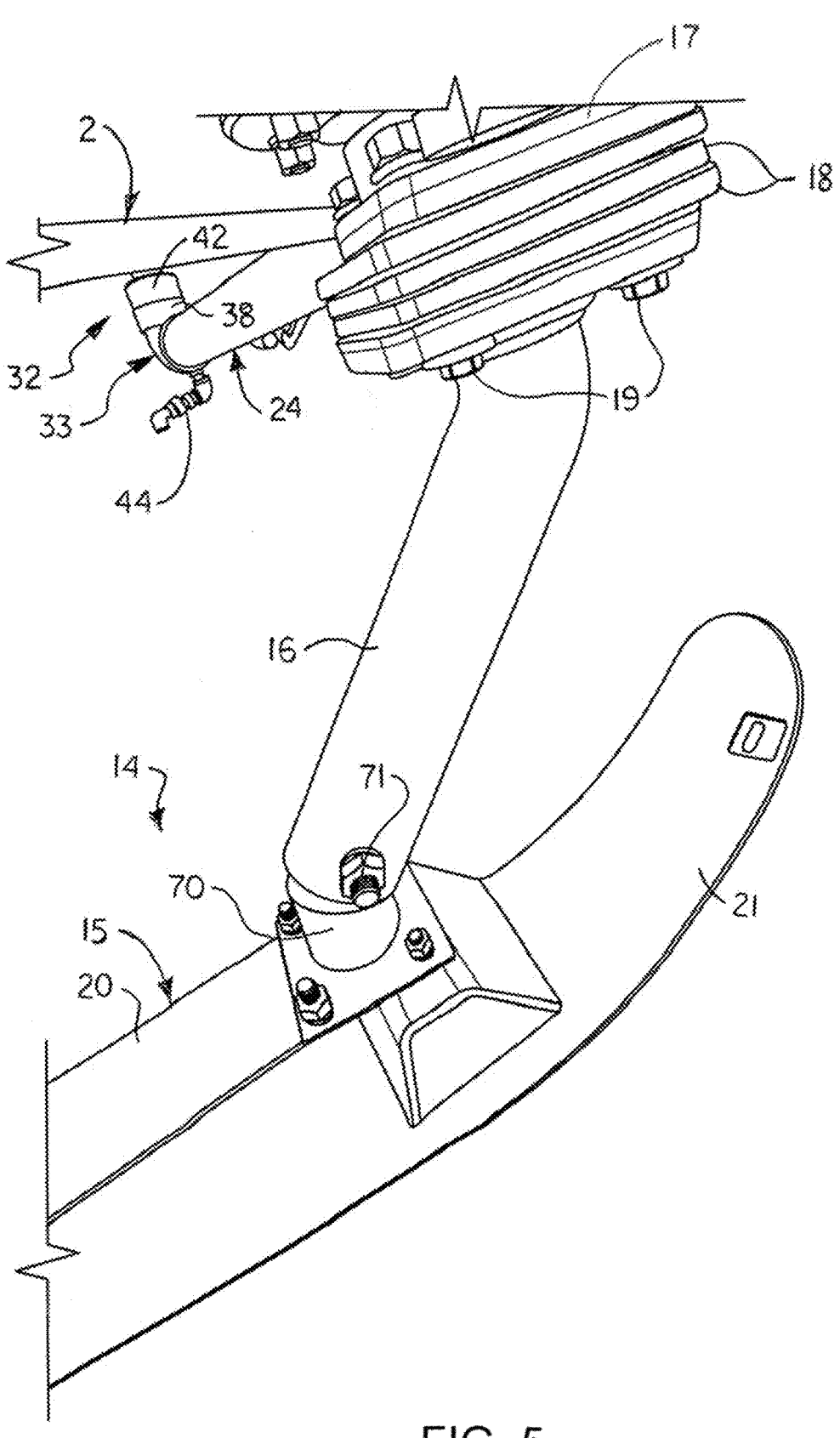
FIG. 5 is a side perspective view, partially in section, of a typical frame mobility member having a frame skid configured to render the wick applicator assembly mobile on variously contoured terrain.

As further illustrated in FIGS. 1 and 2, in some embodiments, at least one, and typically, a pair of spaced-apart frame mobility members 14 may be mounted on the reservoir support frame 2 in spaced-apart relationship to each other. Each frame mobility member 14 may include any type of device, element, component, structure, or combination thereof which is suitable for the purpose of supporting the reservoir support frame 2 on the ground or terrain while enabling the reservoir support frame 2 to traverse the terrain. For example and without limitation, in some embodiments, each frame mobility member 14 may include at least one frame skid 15. As illustrated in FIG. 5, in some embodiments, each frame skid 15 may include a skid arm 16. An arm mount flange 13 may be on the reservoir support frame 2. The skid arm 16 may be mounted to the arm mount flange 13. In some embodiments, the skid arm 16 may be mounted for 360-degree rotation with respect to the arm mount flange 13 typically according to the knowledge of those skilled in the art. Accordingly, an arm bearing assembly 17 may rotatably mount the skid arm 16 to the reservoir support frame 2. A skid support frame 20 may terminate the lower end of the skid arm 16. An elongated skid blade 21 may be supported by the skid support frame 20. Accordingly, as illustrated in FIGS. 9-11, in typical application of the wick applicator assembly 1, which will be hereinafter described, the skid blade 21 of the frame skid 15 may traverse the terrain 86, 87, 88 responsive to forward and/or reverse operation of the vehicle 80. In some embodiments, one or more of the frame mobility members 14 may include at least one wheel (not illustrated) which may be configured to support the reservoir support frame 2 on the ground as the wick applicator assembly 1 traverses the terrain 86, 87, 88.

Figure 12:
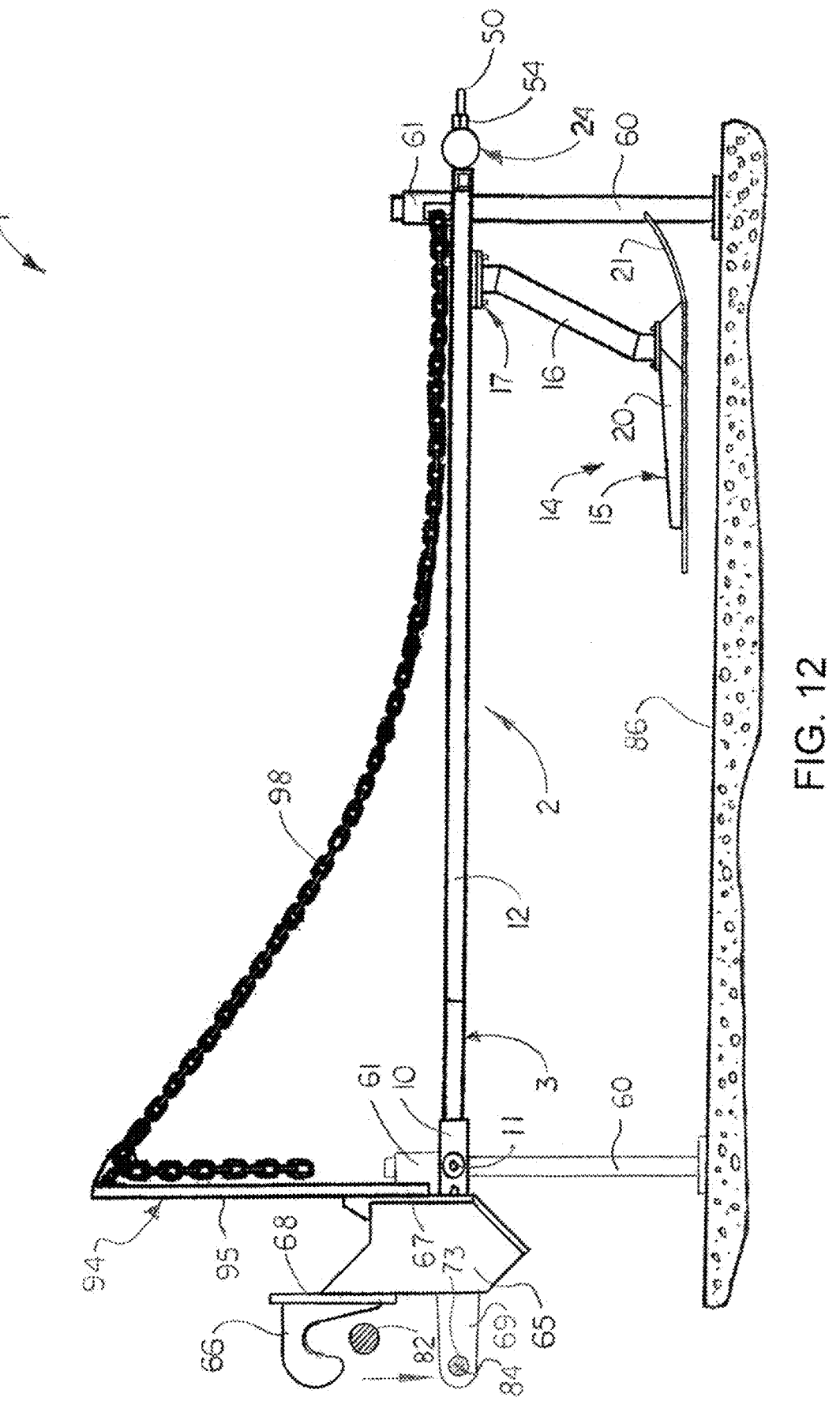
FIG. 12 is a right side view of the wick applicator assembly with the front frame support foot deployed in a typical stowage configuration of the wick applicator assembly.

In some embodiments, the reservoir support frame 2 may be fitted with at least one frame support foot 60. Each front frame support foot 60 may slidably extend through a corresponding foot collar 61 on the reservoir support frame 2 for selective deployment in a raised position (FIGS. 1 and 2) and in a stowing position (FIG. 12). In some embodiments, a foot adjustment pin 62 may engage registering pin openings (not illustrated) in the foot collar 61 and in the frame support foot 60 to facilitate deployment of the frame support foot 60 at a selected height in the foot collar 61. In some embodiments, a hand-operated or motor-operated winch (not illustrated) may additionally or alternatively operably engage the frame support foot 60 for the purpose, typically according to the knowledge of those skilled in the art. Each frame support foot 60 may be selectively deployed in a raised position (FIGS. 1 and 2) and in a stowing position (FIG. 12). In the stowing position illustrated in FIG. 12, the deployed frame support foot 60 may support the reservoir support frame 2 in a stowage position with the frame mobility member 14 in an elevated position with respect to the ground or terrain. In the raised position, the frame support foot 60 may facilitate deployment of the frame mobility member 14 onto the ground or terrain in application of the wick applicator assembly 1.

As further illustrated in FIG. 5, in some embodiments, the arm bearing assembly 17 may facilitate the 360 degree rotation of the skid arm 16 with respect to the arm mount flange 13 and the reservoir support frame 2. For example and without limitation, in some embodiments, the arm bearing assembly 17 of the frame mobility member 14 may rotatably mount the skid arm 16 with respect to the arm mount flange 13. At least one, and typically, multiple, stacked arm mount plates 18 may be assembled on the skid arm 16. A plate opening (not illustrated) may extend through the centers of the arm mount plates 18. A bolt head (not illustrated) which secures the arm bearing assembly 17 with respect to the arm mount plates 18 may extend through the plate opening. Plate fasteners 19 may be extended through registering plate fastener openings (not illustrated) in the arm mount plates 18. The plate fasteners 19 may mount the arm mount plates 18 to the skid arm 16. The arm bearing assembly 17 may be disposed between the arm mount plates 18 and the arm mount flange 13 to rotatably mount the arm mount plates 18 with respect to the reservoir support frame 2. Accordingly, the 360 degree rotation capability of the skid arm 16 with respect to the arm mount flange 13 and the reservoir support frame 2 may enable the reservoir support frame 2 and the liquid reservoir 24 to change directions on the terrain 86, 87, 88 as the vehicle 80 changes directions during application of the wick applicator assembly 1.

As further illustrated in FIG. 5, in some embodiments, the skid arm 16 of each frame mobility member 14 may be selectively length adjustable. Accordingly, in some embodiments, the skid arm 16 may be fitted with at least one telescoping leg assembly 70. The telescoping leg assembly 70 may include multiple telescoping leg segments (not illustrated) which telescopically interface with each other and can be selectively extended or retracted to achieve the desired length of the skid arm 16. A leg assembly fastener 71 may be inserted through registering openings (not illustrated) in the telescoping leg segments and secured to secure the segments at the selected length. Alternative devices or techniques may be utilized for the purpose of facilitating selection in the length of the skid arm 16.

As illustrated in FIGS. 1 and 2, the liquid reservoir 24 may be supported by the front support frame member 22 of the reservoir support frame 2. For example and without limitation, in some embodiments, the liquid reservoir wall 25 may extend along and parallel to the front support frame member 22. At least one reservoir securing fastener 56 may secure the liquid reservoir 24 to the front support frame member 22. The reservoir securing fastener 56 may include any type of fastening device, element, component, or combination thereof which may be suitable for the purpose. For example and without limitation, in some embodiments, the reservoir securing fastener 56 may include at least one screw, bolt, clamp, band, bracket, cable, chain, rope, or any combination thereof.

Figure 14:
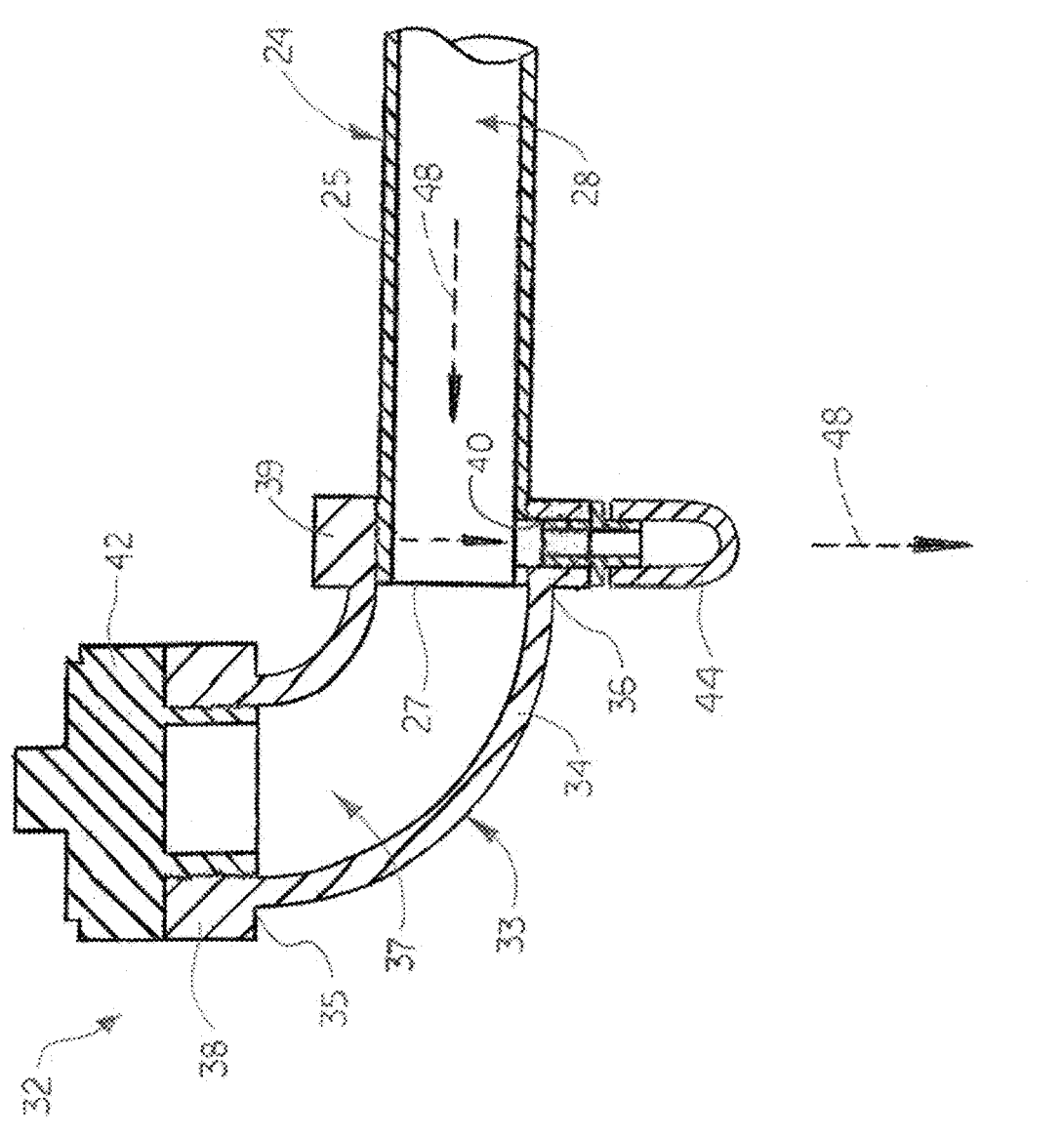
FIG. 14 is a longitudinal sectional view, taken along section lines 14-14 in FIG. 6, of a typical liquid fill device on the liquid reservoir, with the fill cap closing the liquid fill neck of the device and further illustrating typical drainage of excess or residual applicator liquid from the liquid reservoir.
Figure 15:
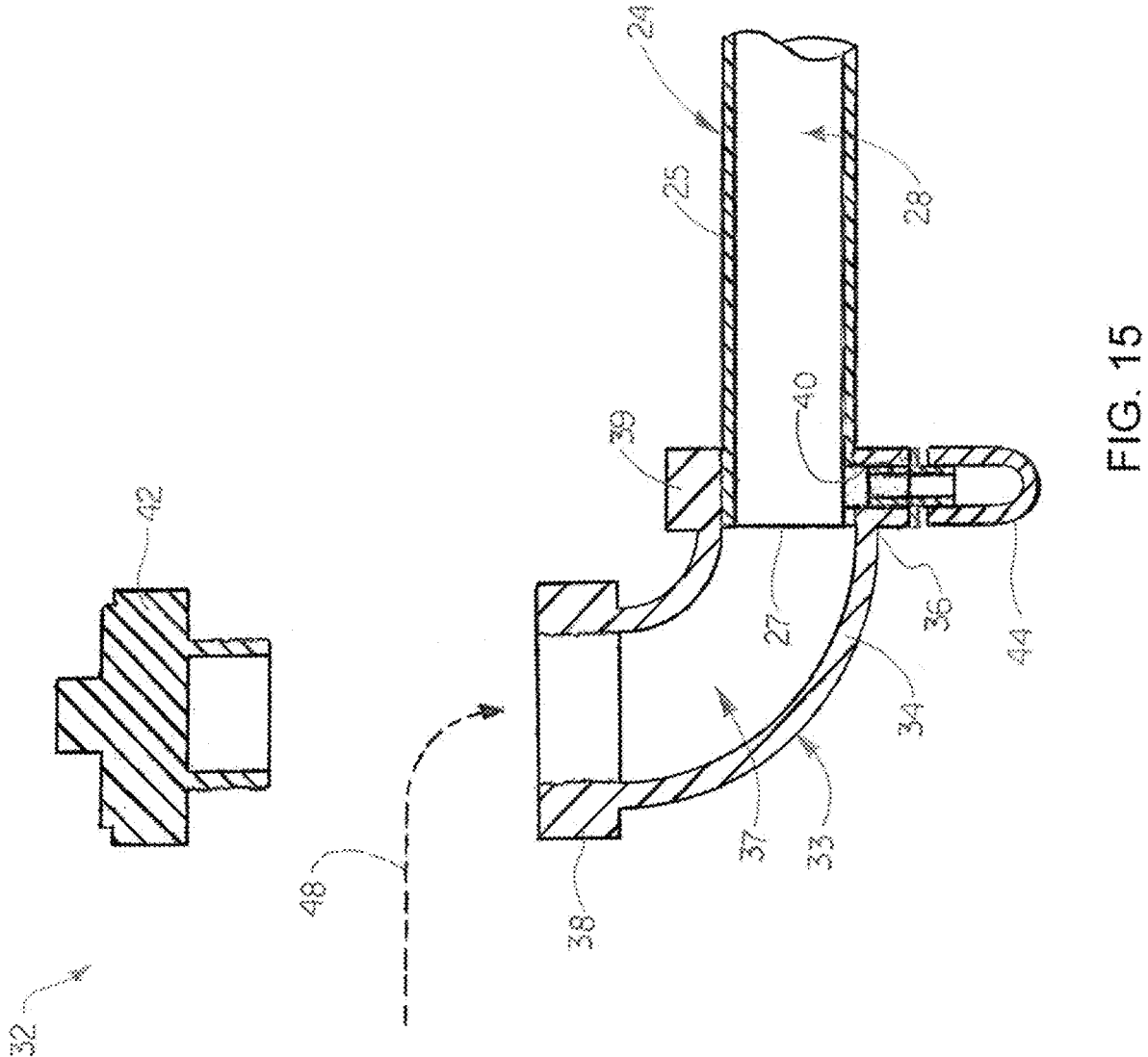
FIG. 15 is a longitudinal sectional view of the liquid fill device illustrated in FIG. 14, with the fill cap removed from the liquid fill neck of the device for placement of the applicator liquid into the liquid reservoir.

As illustrated in FIGS. 13-15, the liquid reservoir 24 may include an elongated liquid reservoir wall 25. As illustrated in FIGS. 1 and 2, the liquid reservoir wall 25 of the liquid reservoir 24 may have a first reservoir end 26, a second reservoir end 27, and a reservoir interior 28 (FIGS. 13-15) which may extend from the first reservoir end 26 to the second reservoir end 27. As illustrated in FIGS. 13 and 14, the reservoir interior 24 may be configured to contain a supply of the applicator liquid 48.

At least one wick member 50 may be on the exterior of the liquid reservoir wall 25 of the liquid reservoir 24. As illustrated in FIGS. 1 and 2, in some embodiments, multiple wick members 50 may be on the liquid reservoir wall 25 typically in adjacent, overlapping relationship with respect to each other along the length of the liquid reservoir 24 generally from the first reservoir end 26 to the second reservoir end 27. As illustrated in FIG. 13, each wick member 50 may be disposed in fluid-wicking relationship to the reservoir interior 28 of the liquid reservoir 24. For example and without limitation, in some embodiments, each wick member 50 may have opposite wick member ends 51 (one of which is illustrated in FIG. 13) which may insert through a respective pair of wick fasteners 54. Each wick fastener 54 may be threaded through a corresponding wick opening 29 in the liquid reservoir wall 25. Each wick member 50 may include a liquid-wicking material which is suitable for wicking of the applicator liquid 48 via capillary action from the reservoir interior 28 of the liquid reservoir 24 for discharge of the applicator liquid 48 onto vegetation on the terrain 86, 87, 88 as the wick applicator assembly 1 traverses the terrain. Non-limiting examples of liquid-wicking materials which may be suitable for the purpose may include synthetic fabrics (textiles) such as polyester, nylon, polypropylene; natural materials such as cotton, wool, and silk; paper and cellulose-based materials; superabsorbent polymer-based materials; and any combination thereof.

Figure 6:
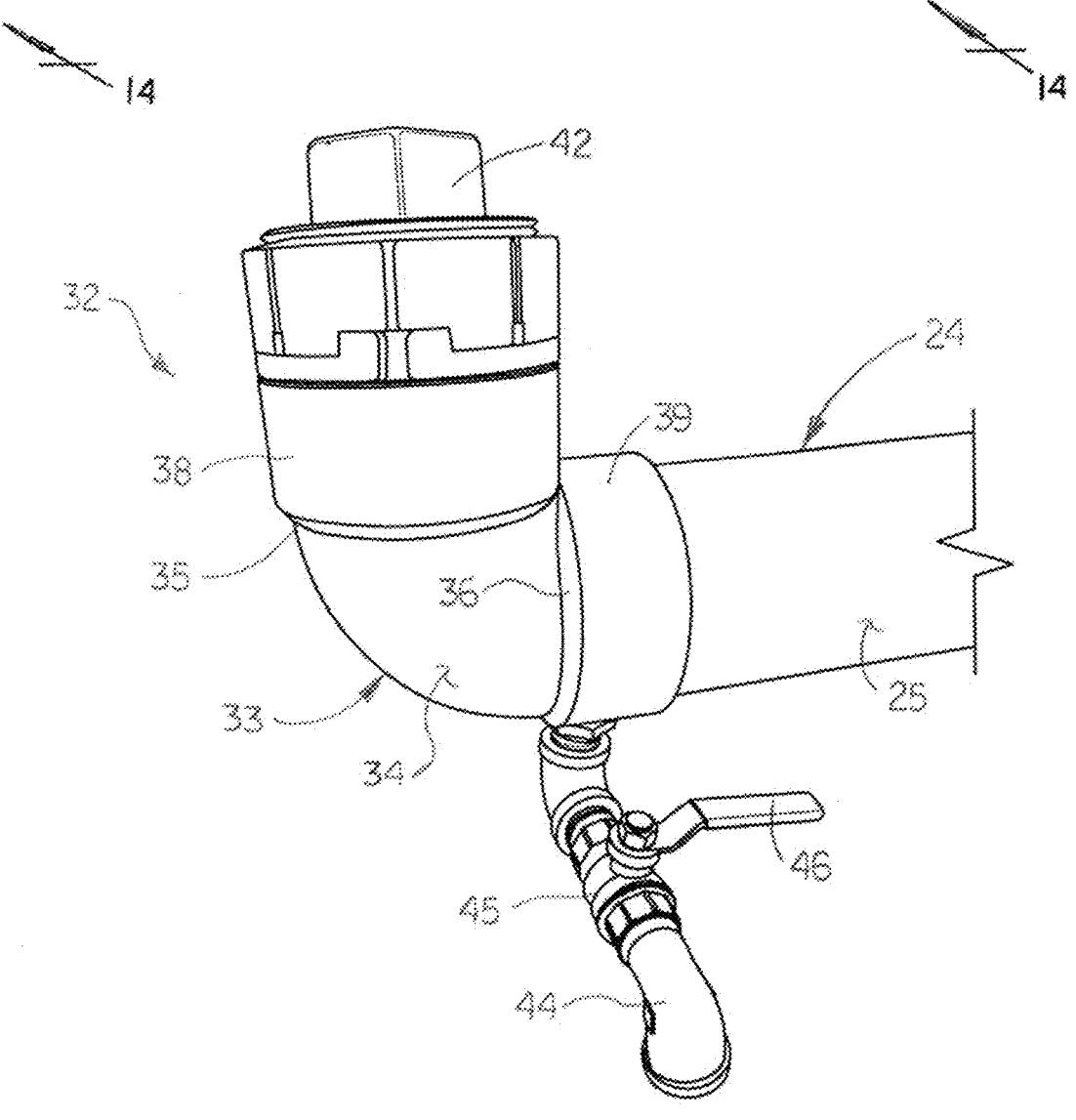
FIG. 6 is a perspective view of a typical liquid fill device on the liquid reservoir of the wick applicator assembly.

As illustrated in FIG. 2, in some embodiments, a reservoir cap 30 may close the first reservoir end 26 of the liquid reservoir wall 25. A liquid fill device 32 may be disposed in fluid communication with the reservoir interior 28 (FIG. 14) at the second reservoir end 27 of the liquid reservoir wall 25. The liquid fill device 32 may have any design which is suitable for the purpose of facilitating placement of the applicator liquid 48 into the reservoir interior 28. Accordingly, as illustrated in FIGS. 6, 14 and 15, in some embodiments, the liquid fill device 32 may include a liquid fill neck 33. The liquid fill neck 33 may include a curved or arcuate neck wall 34 having a liquid fill end 35, a liquid discharge end 36, and a neck bore 37 which extends from the liquid fill end 35 to the liquid discharge end 36. A fill end flange 38 and a discharge end flange 39 may terminate the respective opposite liquid discharge end 35 and liquid discharge end 36 of the liquid fill neck 33. The discharge end flange 39 may structurally interface with the second reservoir end 27 of the liquid reservoir wall 25 through a threaded and/or other suitable type of connection.

As illustrated in FIGS. 14 and 15, a fill cap 42 may releasably interface with the fill end flange 38 on the liquid fill neck 33, such as via a threaded connection and/or an interference fit connection, for example and without limitation. The fill cap 42 may be selectively detached from or opened on the fill end flange 38, as illustrated in FIG. 15, to facilitate placement of the applicator liquid 48 into the reservoir interior 28 of the liquid reservoir 24 through the neck bore 37 of the liquid fill neck 33.

In some embodiments, the liquid fill device 32 may include at least one drain spigot 44. The drain spigot 44 may facilitate selective draining of excess or residual applicator liquid 48 from the reservoir interior 28 of the liquid reservoir 24. As illustrated in FIG. 6, the drain spigot 44 may include a drain spigot valve 45 fitted with a valve handle 46. As illustrated in FIGS. 14 and 15, in some embodiments, the drain spigot 44 may be disposed in fluid communication with the reservoir interior 28 of the liquid reservoir 24 through a drain spigot opening 40 in the liquid reservoir wall 25 of the liquid reservoir 24 and the discharge end flange 39 of the liquid fill neck 33. However, it will be recognized and understood that the drain spigot 44 may be alternatively or additionally disposed in fluid communication with the reservoir interior 28 at any point or at multiple selected points along the length of the liquid reservoir 24 and/or the liquid fill neck 33.

In typical application, the wick applicator assembly 1 may be utilized in an agricultural operation to discharge the applicator liquid 48 on soil and/or vegetation (not illustrated) on the terrain 86, 87, 88, typically for soil preparation and/or vegetation growth. Depending on the application, the applicator liquid 48 may include a herbicide, pesticide, fertilizer, and/or other agricultural substance for preparation of the soil and/or growth of the vegetation. Accordingly, the reservoir support frame 2 may be coupled to the vehicle 80. In some applications, the vehicle 80 may be a front end loader vehicle such as a MASSEY FERGUSON™ FL. 3615 loader. It will be recognized and understood by those skilled in the art, however, that the wick applicator assembly 1 may be equally adapted or adaptable for coupling to other models and types of front end loader vehicles and other vehicles 80.

Figure 7:
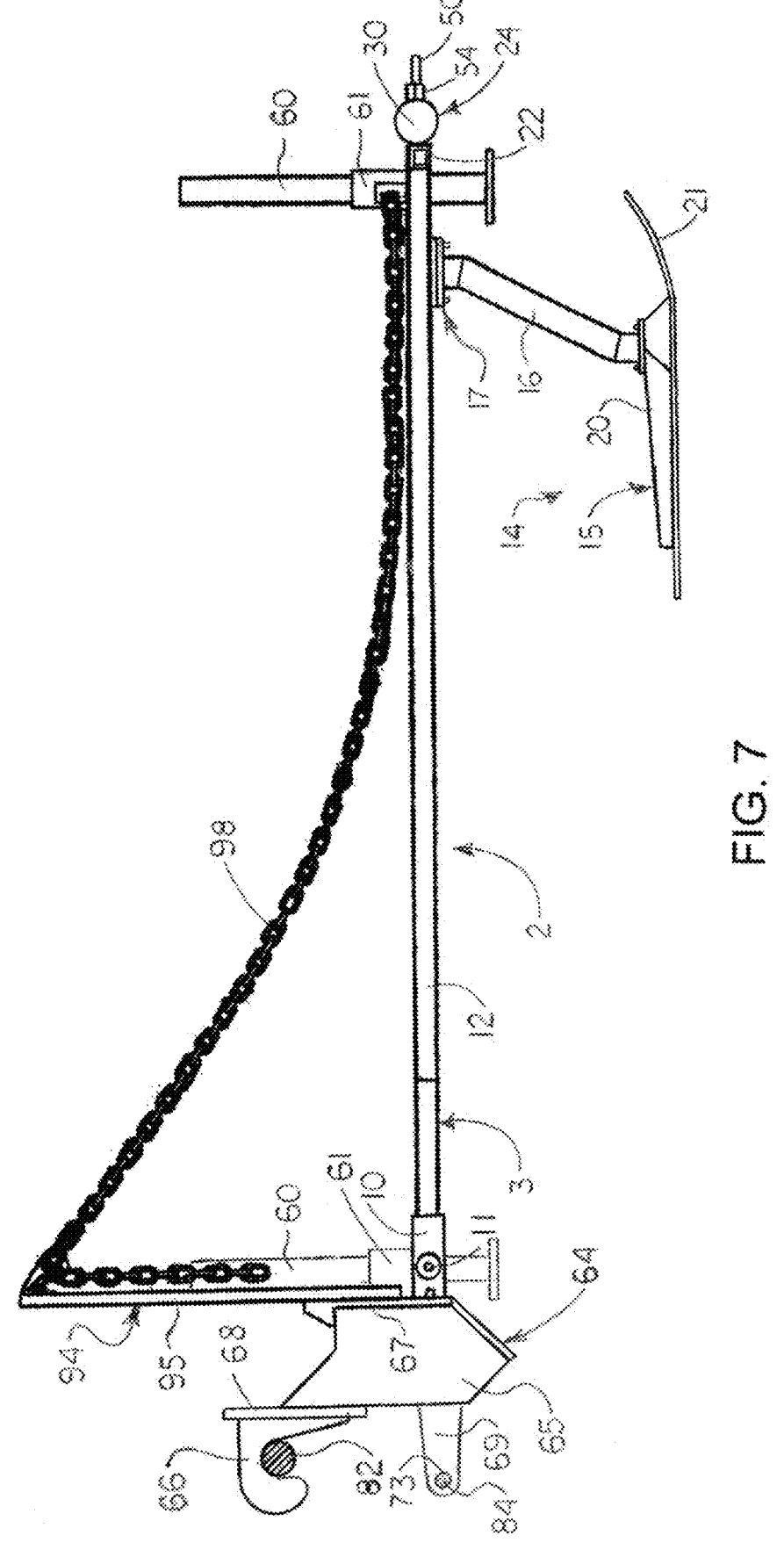
FIG. 7 is a right side view of the wick applicator assembly, with the assembly mount portion coupled to a bucket mount frame (shown in cross-section) on the front end loader vehicle.

The excavator bucket (not illustrated) of the front end loader vehicle 80 may initially be removed from the bucket mount frame 82 on the boom 81 of the vehicle 80. The assembly mount portion 64 on the reservoir support frame 2 of the wick applicator assembly 1 may then be coupled to the bucket mount frame 82. In some embodiments, this may be accomplished by engagement of the frame coupling hooks 66 on the assembly mount portion 64 with the bucket mount frame 82, typically as illustrated in FIGS. 3 and 7. As illustrated in FIG. 12, the wick applicator assembly 1 may initially be deployed in the stowage position, with each frame support foot 60 deployed in the extended position in each corresponding foot collar 61. The wick applicator assembly 1 may be selectively deployed from the stowage position to the functional position illustrated in FIG. 9 by disengagement of the frame support foot 60 from the foot collar 61, typically by removal of the foot adjusting pin 62; raising the frame support foot 60 in the foot collar 61; and redeploying the foot adjusting pin 62 to support the frame support foot 60 in the raised position, respectively. As illustrated in FIGS. 9-11, in the functional position of the wick applicator assembly 1, the frame mobility members 14 may engage and rest on the terrain 86. As further illustrated in FIG. 12, as the wick application assembly 1 is deployed from the stowage configuration to the functional configuration, the frame coupling hooks 66 on the assembly mount portion 64 of the reservoir support frame 2 may be lowered into or otherwise placed into engagement with the bucket mount frame 82 on the front end loader vehicle 80. In some embodiments, the frame pin 11 may render the reservoir support frame 2 pivotal with respect to the assembly mount portion 64 about and within the vertical plane 76 (FIG. 8).

With the valve handle 46 (FIG. 6) on the drain spigot valve 45 of the drain spigot 44 in the closed position, a supply of the applicator liquid 48 may be placed in the reservoir interior 28 of the liquid reservoir 24. Accordingly, in some embodiments, this may be accomplished by removal of the fill cap 42 from the liquid fill neck 33 of the liquid fill device 32, as illustrated in FIG. 15, followed by pouring of the applicator liquid 48 through the neck bore 37 of the liquid fill neck 33 and into the reservoir interior 28 of the liquid reservoir 24. A sufficient quantity of the applicator liquid 48 may be poured through the liquid fill neck 33 until the level of the applicator liquid 48 reaches the desired level in the liquid reservoir 24. In some embodiments, the liquid reservoir 24 may include at least one level-sensing feature (not illustrated) which may be configured to indicate the level of the applicator liquid 48 in the reservoir interior 28. The level sensing feature may include any device, element, component, or combination thereof which may be suitable for the purpose. For example and without limitation, in some embodiments, the level sensing feature may include at least one transparent or translucent level sensing window (not illustrated) which may be in the liquid reservoir wall 25 of the liquid reservoir 24 and through which the level of the applicator liquid 48 therein is visible. The level sensing window may include volume graduation markings which may indicate the quantity or volume of the applicator liquid 48 in the reservoir interior 28. Other level sensing features which may be suitable for the purpose may include level sensing switches which interface with electronic readout displays, for example and without limitation. After the desired quantity or volume of the applicator liquid 48 is placed in the reservoir interior 28, the fill cap 42 may be replaced on the liquid fill neck 33.

The vehicle 80 may next be operated to traverse the reservoir support frame 2 of the wick applicator assembly 1 along the flat terrain 86 (FIG. 9), the inclined terrain 87 (FIG. 10), and/or the sloped terrain 88 (FIG. 11). Simultaneously, as illustrated in FIG. 13, the wick members 50 on the liquid reservoir 24 may wick the applicator liquid 48 from the reservoir interior 28 of the liquid reservoir 24 and discharge the wicked applicator liquid 48 onto the terrain 86, 87, 88.

As the wick applicator assembly 1 is pulled or pushed along the terrain 86, 87, 88 by forward or reverse operation of the vehicle 80, the frame mobility members 14 may traverse and follow variations in the contour of the flat terrain 86, the inclined terrain 87, and/or the sloped terrain 88. Accordingly, as illustrated in FIG. 8, the frame pin 11 may facilitate pivotal movement of the reservoir support frame 2 relative to the assembly mount portion 64 about the support frame pivot arc 90 and within the vertical plane 76.

As was heretofore described with respect to FIG. 5, the typical 360 degree rotation capability of the skid arm 16 with respect to the arm mount flange 13 and the reservoir support frame 2 may enable the reservoir support frame 2 and the liquid reservoir 24 to change directions on the terrain 86, 87, 88 as the vehicle 80 changes directions during application of the wick applicator assembly 1. As was heretofore described with respect to FIG. 9, the tensioning frame 94 and the reservoir support frame tensioning members 98 may enable the reservoir support frame 2 and the liquid reservoir 24 to follow the depressed contour of a hole or depression (not illustrated) in the terrain 86, 87, 88 as the assembly mount portion 64 pivots forwardly and rearwardly with the bucket mount frame 82 on the boom 81 of the front end loader vehicle 80.

Upon completion of the agricultural operation, the wick applicator assembly 1 may be deployed from the functional configuration back to the stowage configuration. This may be accomplished by deploying the frame support feet 60 from the lowered, functional position illustrated in FIGS. 9-11 to the raised, stowage position illustrated in FIG. 12. Any excess applicator liquid 48 which remains in the liquid reservoir 24 may be selectively drained therefrom through the drain spigot 44, as illustrated in FIG. 14, typically by deployment of the valve handle 46 of the drain spigot valve 45 from the closed position to the open position.

While certain illustrative embodiments of the disclosure have been described above, it will be recognized and understood that various modifications can be made to the embodiments and the appended claims are intended to cover all such modifications which may fall within the spirit and scope of the disclosure.

I claim:
1. A wick applicator assembly configured for coupling to a vehicle and traversing variously contoured terrain to discharge an applicator liquid on the terrain, the wick applicator assembly comprising:

a reservoir support frame;

an assembly mount portion configured for coupling to the vehicle, the assembly mount portion pivotally interfacing with the reservoir support frame and the reservoir support frame pivotal with respect to the assembly mount portion within a vertical plane;

at least one frame mobility member on the reservoir support frame, the frame mobility member configured to support the reservoir support frame for traversal on the terrain;

a liquid reservoir supported by the reservoir support frame, the liquid reservoir having a reservoir interior configured to contain the applicator liquid; and at least one wick member on the liquid reservoir, the wick member disposed in fluid wicking relationship to the reservoir interior of the liquid reservoir for wicking and discharge of the applicator liquid;

wherein the reservoir support frame comprises at least one main support frame member pivotal with respect to the assembly mount portion and a front support frame member supported by the main support frame member, and the liquid reservoir is supported by the front support frame member; and a tensioning frame on the reservoir support frame and at least one reservoir support frame tensioning member extending from the tensioning frame to the reservoir support frame.

2. The wick applicator assembly of claim 1 wherein the reservoir support frame tensioning member comprises at least one reservoir support frame tensioning chain.

3. The wick applicator assembly of claim 1 comprising a liquid fill device in fluid communication with the reservoir interior of the liquid reservoir.

4. The wick applicator assembly of claim 3 comprising a drain spigot in fluid communication with the liquid fill device.

5. The wick applicator assembly of claim 1 wherein the assembly mount portion is configured for coupling to a bucket mount frame on a boom of a front end loader vehicle.

6. The wick applicator assembly of claim 1 wherein the frame mobility member comprises at least one frame skid.

7. The wick applicator assembly of claim 1 wherein the at least one main support member comprises a pair of elongated, parallel main support frame members, and the front support frame member is supported by the main support frame members.

8. The wick applicator assembly of claim 1 wherein the at least one main support frame member comprises a pair of elongated, parallel main support frame members, and comprising at least one reinforcing support frame member extending between the main support frame members.

9. A wick applicator assembly configured for coupling to a vehicle and traversing variously contoured terrain to discharge an applicator liquid on the terrain, the wick applicator assembly comprising:

an assembly mount portion configured for coupling to the vehicle;

a reservoir support frame pivotally interfacing with the assembly mount portion, the reservoir support frame comprising:

at least one main support frame member having a rear frame member end and a front frame member end, the rear frame member end pivotal with respect to the assembly mount portion within a vertical plane; and

a front support frame member on the front frame member end of the main support frame member;

at least one frame mobility member on the reservoir support frame, the frame mobility member configured to support the reservoir support frame for traversal on the terrain;

a liquid reservoir supported by the front support frame member of the reservoir support frame, the liquid reservoir having a reservoir interior configured to contain the applicator liquid;

at least one wick member on the liquid reservoir, the wick member disposed in fluid wicking relationship to the reservoir interior of the liquid reservoir for wicking and discharge of the applicator liquid;

wherein the at least one main support frame member comprises a pair of elongated, parallel main support frame members, and the front support frame member is supported by the main support frame members; and a tensioning frame on the reservoir support frame and a pair of spaced-apart reservoir support frame tensioning members extending from the tensioning frame to the front support frame member of the reservoir support frame.

10. The wick applicator assembly of claim 9 wherein the pair of reservoir support frame tensioning members comprises a pair of reservoir support frame tensioning chains, respectively.

11. The wick applicator assembly of claim 9 comprising a liquid fill device in fluid communication with the reservoir interior of the liquid reservoir.

12. The wick applicator assembly of claim 11 comprising a drain spigot in fluid communication with the liquid fill device.

13. A wick applicator assembly configured for coupling to a vehicle and traversing variously contoured terrain to discharge an applicator liquid on the terrain, the wick applicator assembly comprising:

an assembly mount portion comprising a pair of spaced-apart frame coupling hooks configured for engagement with the vehicle;

a reservoir support frame pivotally interfacing with the assembly mount portion, the reservoir support frame comprising:

a pair of elongated, parallel, spaced-apart main support frame members having a pair of rear frame member ends, respectively, and a pair of front frame member ends, respectively, the rear frame member ends pivotal with respect to the assembly mount portion within a vertical plane; and a front support frame member on the front frame member ends of the main support frame members;

a tensioning frame comprising:

a pair of parallel, spaced-apart vertical tensioning frame members supported by the assembly mount portion;

a lower tensioning frame member extending between the vertical tensioning frame members; and an upper tensioning frame member extending between the vertical tensioning frame members in parallel, spaced-apart relationship to the lower tensioning frame member; and a pair of reservoir support frame tensioning members extending from the vertical tensioning frame members, respectively, to the front support frame member of the reservoir support frame;

15

16 at least one frame mobility member on the reservoir support frame, the frame mobility member configured to support the reservoir support frame for traversal on the terrain;

a liquid reservoir comprising:

an elongated liquid reservoir wall supported by the reservoir support frame, the liquid reservoir wall having a first reservoir end, a second reservoir end, and a reservoir interior extending from the first reservoir end to the second reservoir end, the reservoir interior configured to contain the applicator liquid;

a plurality of wick members on the liquid reservoir, the wick members disposed in fluid wicking relationship to the reservoir interior of the liquid reservoir for wicking and discharge of the applicator liquid;

a reservoir cap closing the reservoir interior at the first reservoir end; and a liquid fill device disposed in fluid communication with the reservoir interior at the second reservoir end.

14. The wick applicator assembly of claim 13 wherein the frame mobility member comprises at least one frame skid.

15. The wick applicator assembly of claim 13 wherein the pair of support frame tensioning members comprises a pair of support frame tensioning chains, respectively.

16. The wick applicator assembly of claim 13 comprising a drain spigot in fluid communication with the liquid fill device.

* * * * *